United States Patent
Hayes et al.

(10) Patent No.: US 12,357,937 B1
(45) Date of Patent: Jul. 15, 2025

(54) DEMISTER WITH RINSE-IN-PLACE FILTERS AND METHOD

(71) Applicant: Quickdraft, Inc., Canton, OH (US)

(72) Inventors: Jonathon Charles Hayes, Hartville, OH (US); Michael R. Webb, Navarre, OH (US); Andrew P. Grow, Mogadore, OH (US); Cephas Tetteh Kudzordzi, Uniontown, OH (US); Jonathan E. Mitchell, East Rochester, OH (US); Mark B. Zellers, Canal Fulton, OH (US); Mick Flickinger, Canal Fulton, OH (US); Robert Prachar, Akron, OH (US)

(73) Assignee: Quickdraft, Inc., Canton, OH (US)

( * ) Notice: Subject to any disclaimer, the term of this patent is extended or adjusted under 35 U.S.C. 154(b) by 0 days.

(21) Appl. No.: 17/735,894

(22) Filed: May 3, 2022

(51) Int. Cl.
| | |
|---|---|
| *B01D 46/00* | (2022.01) |
| *B01D 46/69* | (2022.01) |
| *B01D 46/79* | (2022.01) |

(52) U.S. Cl.
CPC ............ *B01D 46/79* (2022.01); *B01D 46/69* (2022.01); *B01D 2273/14* (2013.01)

(58) Field of Classification Search
CPC ........ B01D 50/60; B01D 47/06; B01D 46/79; B01D 46/69; B01D 2273/14; B01D 1/305; G01F 23/30
USPC ....................................... 95/281; 96/228–233
See application file for complete search history.

(56) References Cited

U.S. PATENT DOCUMENTS

| | | | | |
|---|---|---|---|---|
| 3,494,113 A | * | 2/1970 | Kinney | B01D 46/0005 55/497 |
| 3,623,910 A | * | 11/1971 | Calhoun | B01D 46/70 96/228 |
| 3,710,548 A | | 1/1973 | Coughlin | |
| 3,856,487 A | | 12/1974 | Perez | |
| 4,157,251 A | * | 6/1979 | Colomer | B01D 46/10 96/229 |
| 4,205,412 A | | 6/1980 | Weber | |
| 4,222,748 A | | 9/1980 | Argo et al. | |
| 4,435,197 A | * | 3/1984 | Nijhawan | B01D 46/0006 55/374 |
| 5,281,246 A | * | 1/1994 | Ray | B01D 50/20 55/472 |
| 5,938,820 A | | 8/1999 | Peters et al. | |
| 6,099,612 A | * | 8/2000 | Bartos | B01D 46/62 55/482 |
| 2004/0149134 A1 | * | 8/2004 | Chen | F24F 3/167 96/297 |

(Continued)

*Primary Examiner* — T. Bennett McKenzie
(74) *Attorney, Agent, or Firm* — Fred Zollinger (57) ABSTRACT

A demister includes demister filters that are rinsed in place with sprayed liquid during the normal operation of the demister. The filters remain in place and the demister continues to operate during the rinsing process. The disclosure also provides a method of rinsing the filters during the continued operation of the demister. The demister filters that can be moved between an operational position to an extended cleaning position where they can be cleaned without fully removing them from the demister. The filters are slid out through an open door to provide access for cleaning. The disclosure also provides a method of moving the filters out of the demister to extended positions and cleaning the filters in the extended positions.

12 Claims, 7 Drawing Sheets

(56) References Cited

U.S. PATENT DOCUMENTS

| | | | |
|---|---|---|---|
| 2010/0263344 A1* | 10/2010 | Haynam | B01D 46/2414 |
| | | | 55/502 |
| 2012/0186451 A1 | 7/2012 | Duesel, Jr. et al. | |
| 2014/0348711 A1* | 11/2014 | Ajemian | B01D 50/10 |
| | | | 422/123 |
| 2015/0122498 A1* | 5/2015 | Duesel, Jr. | B01D 1/0058 |
| | | | 166/305.1 |
| 2016/0339376 A1* | 11/2016 | Magee | B01D 46/0001 |
| 2020/0324239 A1* | 10/2020 | Lin | B01D 46/12 |
| 2022/0212138 A1 | 7/2022 | Itokawa et al. | |
| 2023/0191303 A1* | 6/2023 | Graham | B01D 46/06 |
| | | | 55/341.1 |

\* cited by examiner

DEMISTER WITH RINSE-IN-PLACE FILTERS AND METHOD

BACKGROUND OF THE DISCLOSURE

1. Technical Field

The disclosure relates to demisters used to separate debris from an exhaust air flow. In particular, the disclosure relates to a demister that is used to filter material from an exhaust air flow such as those routed from a commercial cooking operation or paper manufacturing operation. The demister includes filters and a rinse-in-place system usable during the normal operation of the demister.

2. Background Information

A demister is part of a system that filters debris such as grease, oil, and/or particulate from an exhaust air stream before the exhaust air stream is discharged to the atmosphere. In a paper manufacturing operation, paper pulp dust is captured in exhaust flows and it is desirable to remove the pulp dust from the air. In commercial cooking operations, exhaust hoods are used with some equipment to remove the air and debris from above the cooking operation to a location outside of the facility. The exhaust location is often above the roof of the facility. If the exhaust flow is not filtered or cleaned, the debris from the exhaust flow falls to the roof where it must be cleaned periodically. With some materials, the debris attracts birds, insects, and rodents.

A demister system is used to filter a substantial amount of the debris from the exhaust flow. For example, a demister can be used as part of a commercial oil frying operation where exhaust hoods capture and move the oil-laden exhaust air from above the hot oil fryers. Operators of these systems wish to remove as much of the oil and food particulate as possible before the exhaust is discharged. The exhaust flow is passed through the demister where it is subject to centrifugal forces, slowed, and redirected to drop material from the exhaust flow. Demisters also pass the exhaust flow through water sprays to knock oil from the flow. The material that is removed in the demister falls into an external separate water recirculation tank where the oil is drained with the water and directed to a collection container. The oil-laden exhaust air is also passed through filters which gather the oil. As these filters gather oil and particulate matter, they must be removed and cleaned to allow the demister to function at acceptable efficiency.

SUMMARY OF THE DISCLOSURE

The disclosure provides a demister that includes an integrated liquid recirculation tank. The disclosed demister with the integrated liquid recirculation tank has a smaller footprint than that required by a demister and a separate recirculation tank. Liquids used to remove debris from the exhaust flow are gathered in the recirculation tank and can be resupplied back to the sprayers of the demister. The disclosure also provides a method of operating a demister having a recirculation tank and maintaining the level of the liquid in the recirculation tank.

The disclosure provides a demister that includes demister filters that are rinsed in place with sprayed liquid during the normal operation of the demister. The filters remain in place and the demister continues to operate during the rinsing process. The disclosure also provides a method of rinsing the filters during the continued operation of the demister.

The disclosure provides a demister with demister filters that can be moved between an operational position to an extended cleaning position where they can be cleaned without fully removing them from the demister. The filters are slid out through an open door to provide access for cleaning. The disclosure also provides a method of moving the filters out of the demister to extended positions and cleaning the filters in the extended positions.

The disclosure provides a method of operating a demister wherein the exhaust flow is passed through a plurality of filters and the filters are periodically sprayed with a cleaning liquid while remaining in place and operational. The disclosure also provides such a method wherein the liquid used on the filters is drained into the recirculation tank that gathers the other separation liquids and debris from the demister. The liquid is recycled into the sprayers. The cleaning liquid can be water.

The individual features described below may be combined in different combinations than specifically described below to form different configurations of the device of the disclosure. The locations of the items can be changed within the body of the demister. The preceding non-limiting aspects of the disclosure, as well as others, are more particularly described below. A more complete understanding of the devices, assemblies, and methods can be obtained by reference to the accompanying drawings, which are not intended to indicate relative size and dimensions of the assemblies. In those drawings and the description below, like numeric designations refer to components of like function. Specific terms used in that description are intended to refer only to the particular structure of the embodiments selected for illustration in the drawings, and are not intended to define or limit the scope of the disclosure.

DETAILED DESCRIPTION OF THE DISCLOSURE

Figure 1:
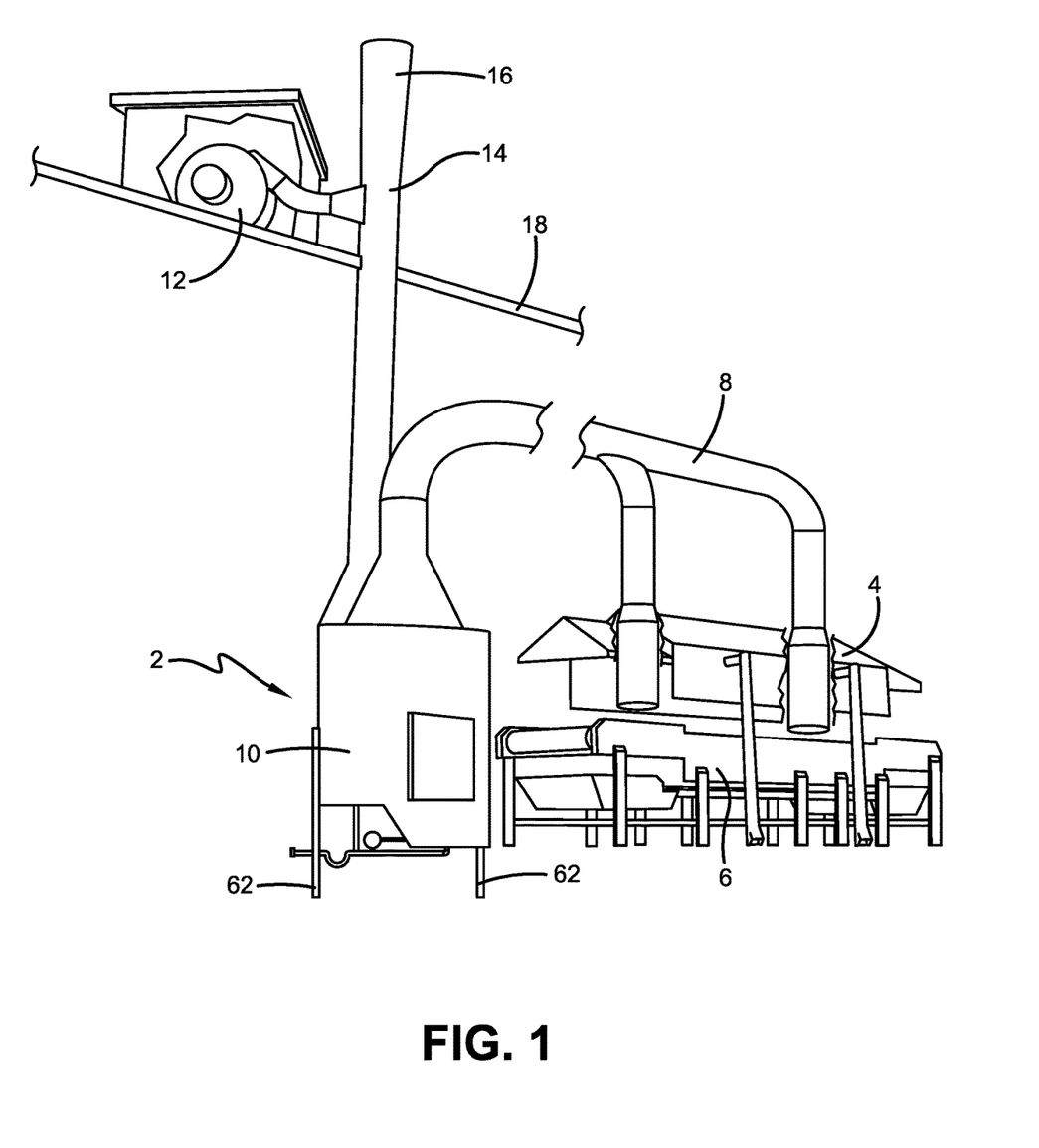
FIG. 1 is a schematic view of an exemplary demister system.

An exemplary demister system is indicated generally by the number 2 in FIG. 1. System 2 includes one or a plurality of exhaust hoods 4 that capture exhaust air and debris from food cooking or food preparation apparatus 6. Exemplary apparatus 6 in the food industry include ovens, fryers, blanchers, washers, mixers, and the like. The exhaust flow that is being captured includes oil or grease as well as particulate matter that is to be removed from the exhaust flow before being discharged to the atmosphere. The particulate, oil, and grease are referred to herein as debris. System 2 can be used with other processes that result in debris carried by an exhaust flow. Paper pulp dust can be removed from an exhaust airflow by system 2. The exhaust flow is moved through a duct 8 from exhaust hood 4 to a demister 10 which can be located in a different portion of the facility. Demister 10 separates the debris from the exhaust flow as discussed below. The exhaust flow exits demister 10 and travels to its outlet 16 past a pressure blower 12 that generates the exhaust flow with a venturi exhauster 14. The outlet 16 can be above the roof 18 of a building. Demister 10 substantially reduces the amount of materials deposited on the roof or into the atmosphere by the exhaust flow.

Pressure blower 12 can be located above the roof 18 in an enclosure. Pressure blower 12 directs its output to venturi exhauster 14 so that the exhaust flow is not passing through pressure blower 12. Venturi exhauster 14 does not obstruct the exhaust flow and does not require moving parts to be in contact with the exhaust flow.

Demister 10 has a body that defines a flow path from an exhaust flow inlet 30 to an exhaust flow outlet 32. The exhaust flow path enters demister 10 into an inlet portion, moves to a first vertical portion where the flow is slowed and moves down, then turns through a filter portion that moves across demister 10 substantially horizontally, and then upwardly through a second vertical portion to exhaust flow outlet 32. With reference to the drawings in which FIG. 2 has been called the front view, body includes a front wall 34, a rear wall 36, a left side wall 38, a right side wall 40, a top wall 42, and a bottom wall 44. These directions are relative to the drawings and demister 10 can be installed with any of walls 34, 36, 38, and 40 located at the front of the unit. A control box 46, positioned at rear wall 36, houses the controls for demister 10. Internal walls 48 and 49 define an inlet chamber 50 in cooperation with the front and rear of demister 10. Internal wall 52 defines a filter chamber 54 between wall 52 and bottom wall 44. Filter chamber 54 houses a plurality of filters 56. Internal walls 58 define a plumbing chamber 60 located above filter chamber 54 and below inlet chamber 50. Legs 62 support demister 10 above the floor.

Figure 4:
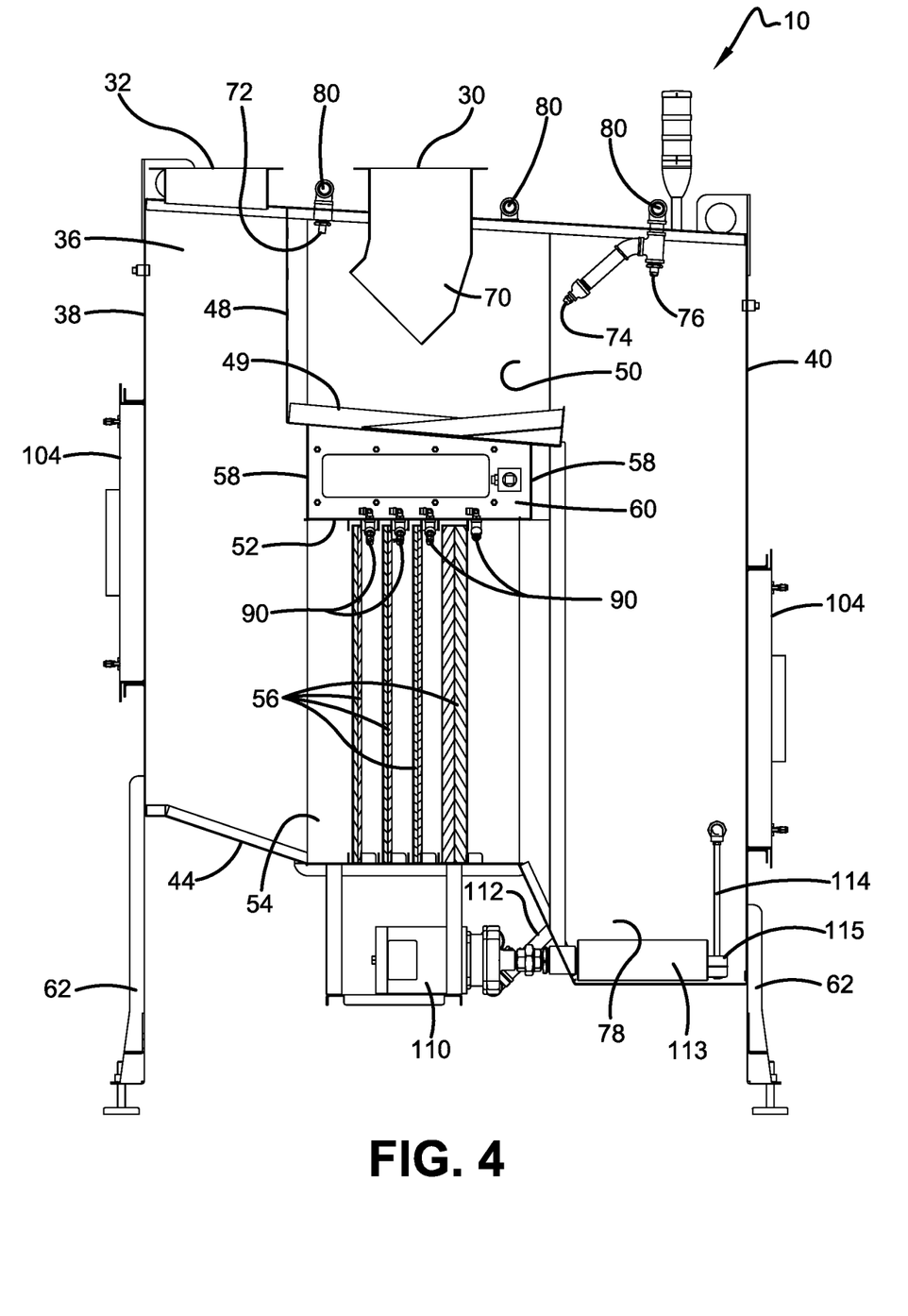
FIG. 4 is a section view taken along line 4-4 of FIG. 3.

With reference to FIG. 4, the debris-laden exhaust flow enters inlet 30 at the top center of the body into inlet chamber 50 where the velocity of the flow is slowed by the larger cross section of inlet chamber 50 compared to duct 8. Slowing the flow causes some of the debris to fall out of the flow. An inlet elbow 70 directs the inlet flow into walls 48 and 49 where the debris-laden exhaust flow directly impinges against walls 48 and 49 to knock additional debris out of the exhaust flow. Liquid sprayers 72, 74, and 76 direct a liquid, such as water, through the exhaust flow to scrub debris from the exhaust flow and to rinse walls 48 and 49. In some applications, a detergent can be mixed with the water. In alternative embodiments, additional sprayers can be used. These can be mounted from top wall 42, from side wall 40, or from walls 34 and 36. The bottom wall 49 of inlet chamber 50 is sloped to drain the liquid and debris to the right (in FIG. 4) where it falls down into a recirculation tank 78. The liquid is supplied to sprayers 72, 74, and 76 with supply pipes 80. The supply of liquid is controlled with a controllable valve 82 such as a 3-way automated ball valve that is in communication and controlled by a controller in control box 46. The liquid is selectively supplied by a supply connected to a liquid inlet 84 which is either connected to the water supply of the location where demister 10 is located, to a local water supply, or to a supply of cleaning liquid that includes detergent. When recirculation tank 78 contains enough liquid, valve 82 and pump 110 cooperate to supply liquid to supply pipes 80 from recirculation tank 78 through supply pipe 112. When the level of liquid in recirculation tank 78 drops below a preset level, valve 82 draws additional liquid from inlet 84 until recirculation tank 78 is refilled. In the exemplary configuration, the controller is a programmable logic controller. The controller coordinates the recirculation system and the filter rinse system. The system gathers data that indicates how often the system is shut down for cleaning and how long it was shut down. Additionally, the system records information about if the plant water (inlet 84) was shut off how many times and for how long. The system is able to be controlled remotely if the customer wants to set it up that way.

Figure 5:
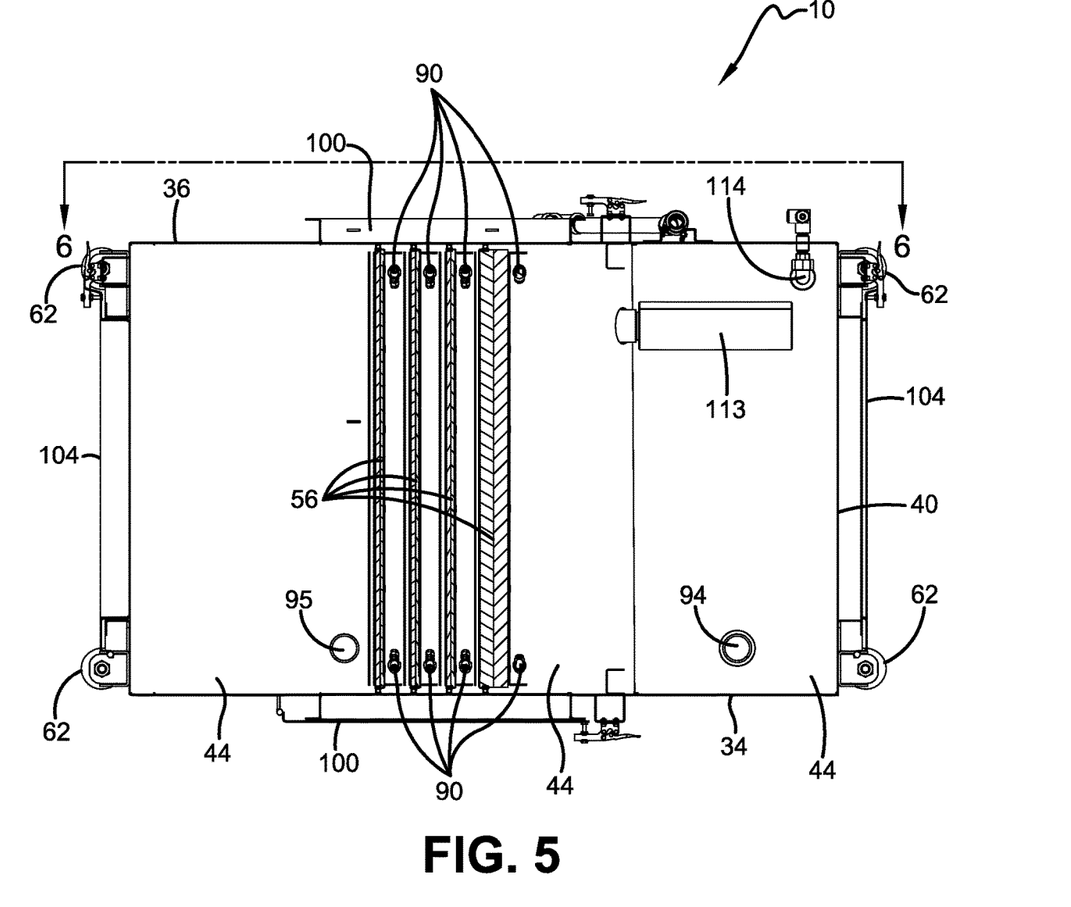
FIG. 5 is a section view taken along line 5-5 of FIG. 2.

The exhaust flow exits inlet chamber 50 and is turned down and then to the left in a large U-turn while the cross sectional area of the flow path is again increased to further slow the flow. This slowing also occurs under liquid sprayer 76 which removes further debris from the exhaust flow. The liquid from sprayer 76 is collected in recirculation tank 78. Once turned horizontally, the exhaust flow now moves at its slowest speed through filter chamber 54 where it moves through a plurality of filters 56 configured to remove debris from the type of exhaust flow with which demister 10 is designed for use. The plurality of filters 56, also known as demister pads 56, capture as much of the remaining debris (grease, oil and particulates) as desired by the user. In the exemplary configuration, filters 56 are heat-resistant, woven-poly material that can operate when wet. The configuration (such as density or thickness) of these filters 56 may change from right to left (in FIG. 4) to capture different sizes and types of debris as the flow moves through the plurality of filters 56. In an exemplary configuration, the first filter is 2½" thick and remaining filters are 15⁄16" thick. The number of filters, the thicknesses, and the mesh size of the filters may change per application. Filters 56 are in their operational position in FIGS. 4-6 wherein the exhaust flow must go through filters 56 on its way to outlet 32. Flow cannot go around filters 56 when the doors 100 on demister 10 are closed as shown in FIG. 5. In the exemplary configuration, doors 100 engage the sides of filters 56 when doors 100 are closed. The exhaust flow can be hot in some applications and filters 56 are configured to function with the hot exhaust flow. Filters 56 are designed to gather debris from the flow and, as such, become debris-laden over time depending on the level of debris present in the exhaust flow. Eventually, filters 56 carry a level of debris where they lose effectiveness and they must be cleaned or replaced. Removing and cleaning filters 56 or removing and replacing filters 56 requires demister 10 to be turned off so the filter cleaning is usually performed during scheduled down time.

Demister 10 includes a rinse-in-place system that periodically rinses filters 56 while they are in place within filter chamber 54 and while demister 10 is operating. The rinse-in-place system includes a plurality of liquid spray nozzles 90 which periodically direct a cleaning liquid, such as water or water that includes a detergent, against filters 56 to remove debris from filters 56. The liquid and debris removed from filters 56 fall to the bottom wall 44 of filter chamber 54 where it either flows into recirculation tank 78 or out through drain 95. Nozzles 90 can spray just the upstream side of a filter, just the downstream side, or both sides of multiple filters. A plurality of nozzles can be used with each filter. In the exemplary configuration, nozzles are located in front of the upper upstream corners of each filter 56 as shown in FIGS. 4 and 5. The initial pair of nozzles 90 to the right of the first filter in FIG. 4 spray the upstream side of the first filter. The remaining nozzles 90 spray both sides. The spray pattern and pressure is adjusted for the type of filter 56 and the type of debris carried by the exhaust stream. An example of the spray pressure is 40 psi with nozzle coverage of 95%. The water temperature is city water temp or the temperature of the supply. The length and frequency of the spray cycle depends on the concentration of the debris.

Each nozzle 90 is connected to liquid inlet 84 through appropriate pipes in plumbing chamber 60. A controllable valve 92 that is controlled by the demister controller controls the delivery of the liquid to nozzles 90. Valve 92 is a two way automated ball valve that supplies the cleaning nozzles 90 with water from inlet 84. In other embodiments, nozzles 90 can be supplied entirely from or partially from recirculation tank 78 with valve 82 supplying liquid from pipe 112. An additional valve for inlet 84 can be used in these embodiments. Nozzles 90 can be turned on at specified times or based on the volume of exhaust flow has passed through demister 10. In some cases where filters 56 become substantially clogged, nozzles 90 can be turned on based on pressure measurements. Spraying filters 56 with water through nozzles at periodic times during the operation of demister 10 has been found to maintain the effectiveness of filters 56 between full cleanings or replacements.

Figure 2:
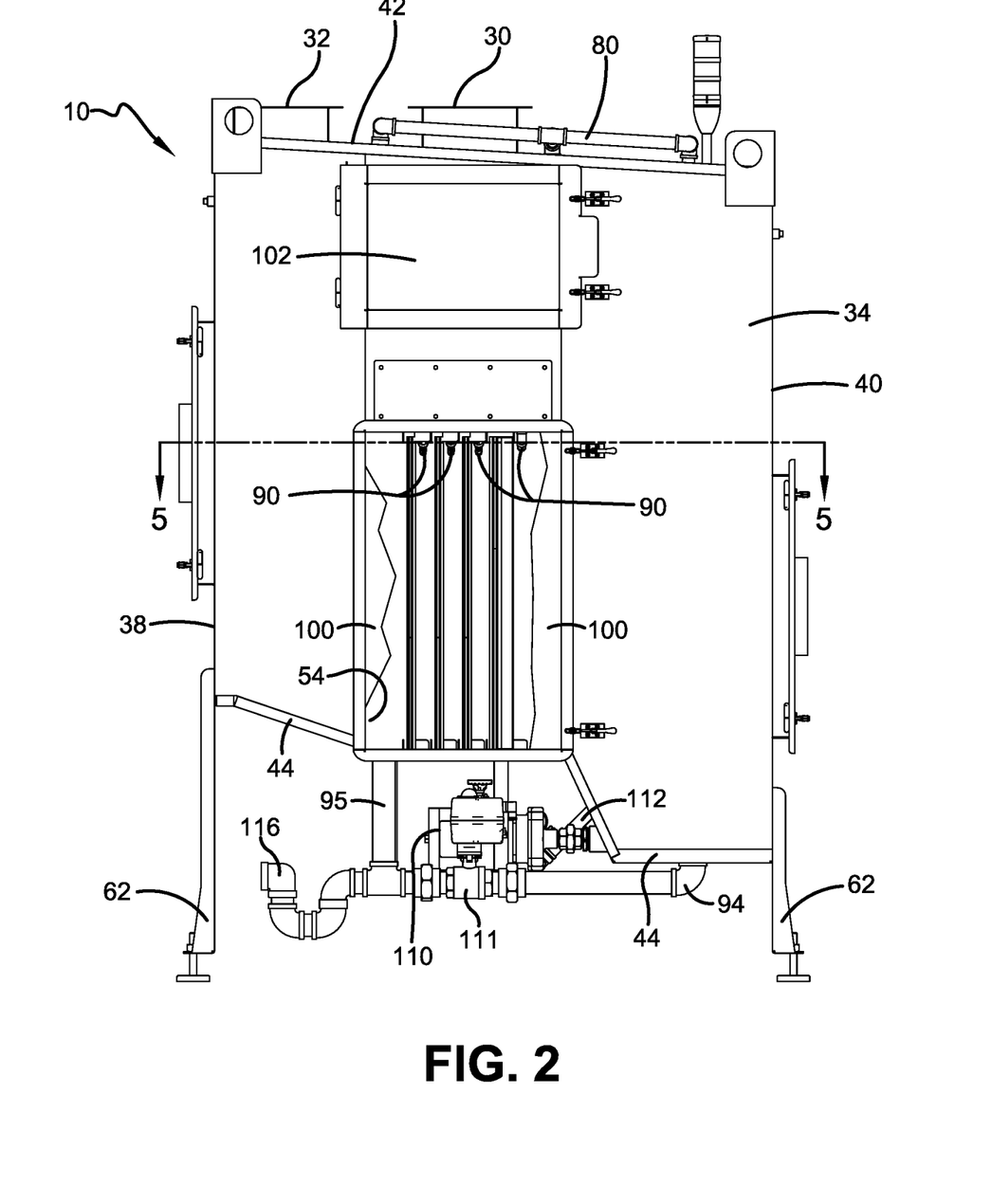
FIG. 2 is a front elevation view of an exemplary demister.
Figure 3:
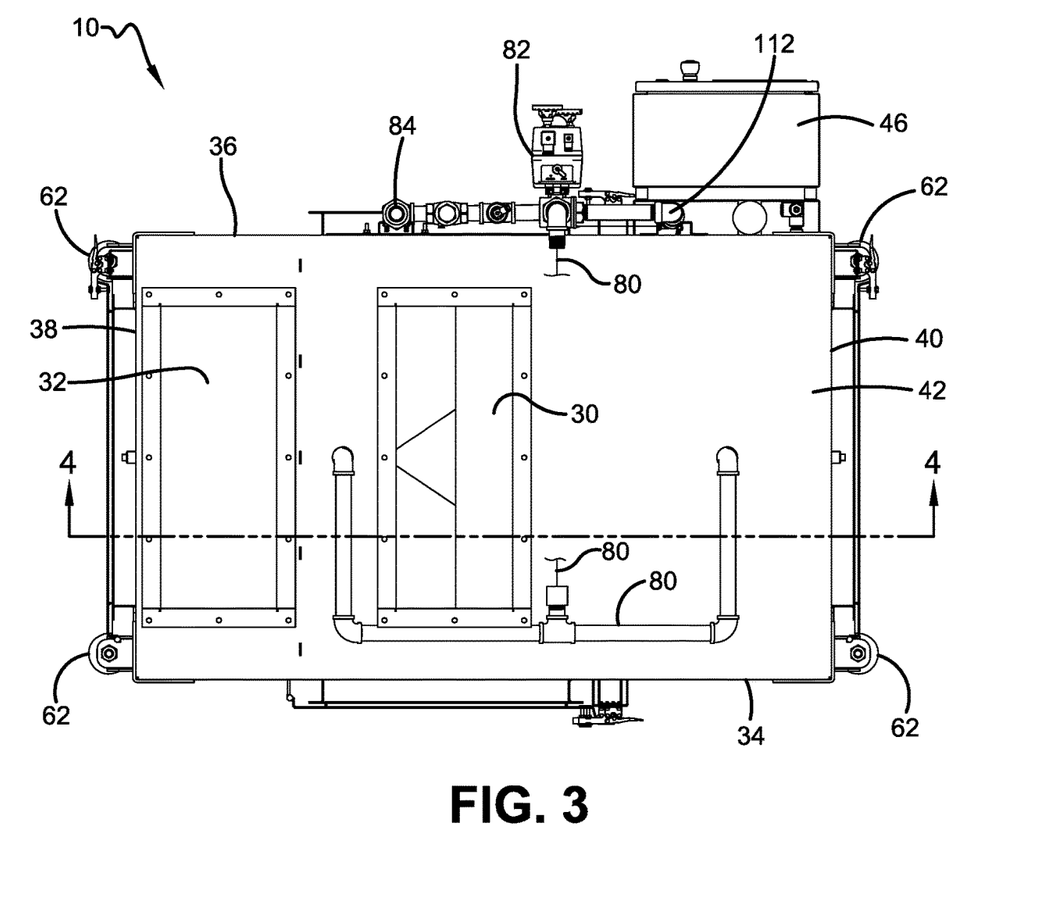
FIG. 3 is a top plan view of FIG. 2.
Figure 6:
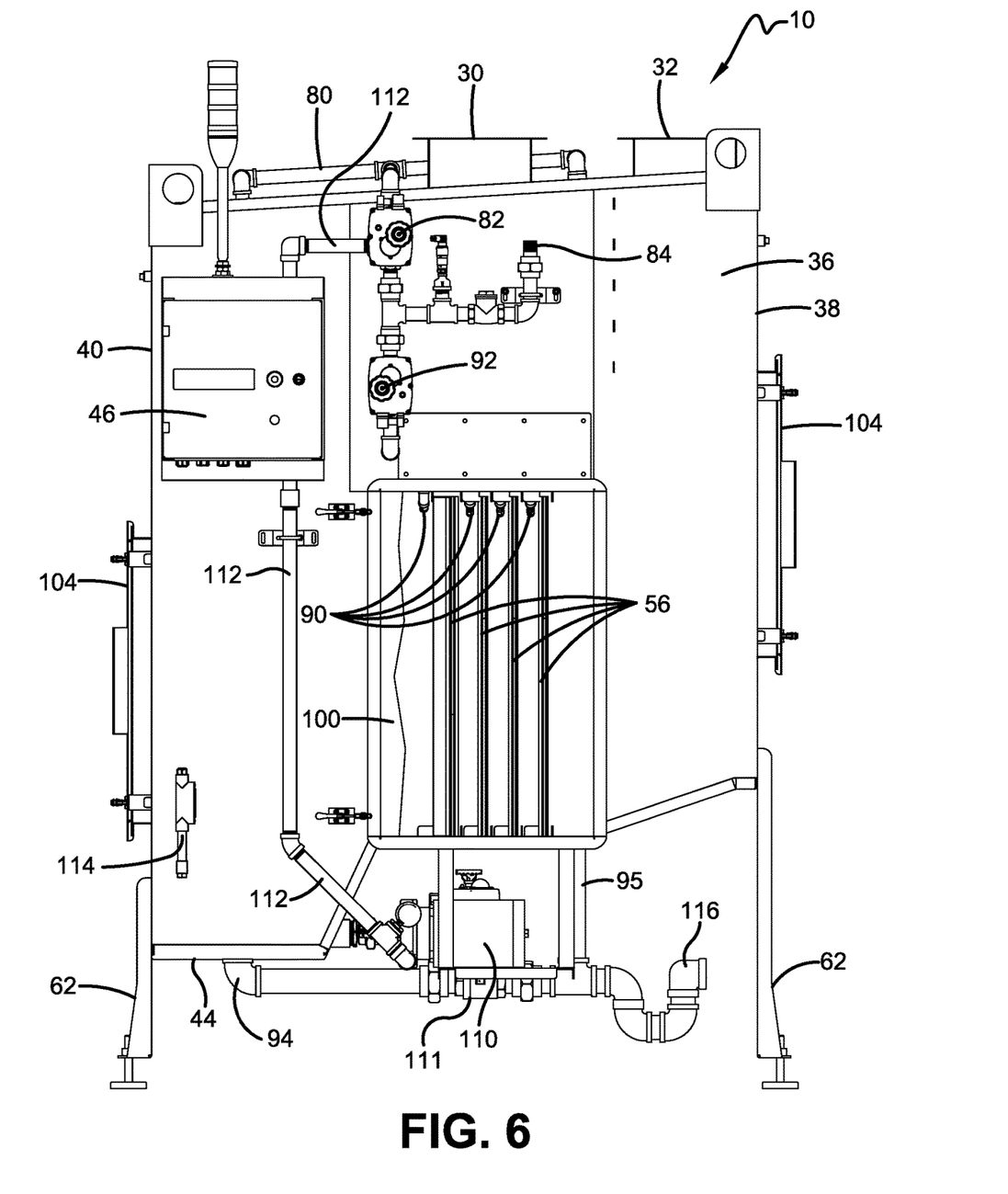
FIG. 6 is a rear elevation view taken along line 6-6 of FIG. 5.
Figure 7:
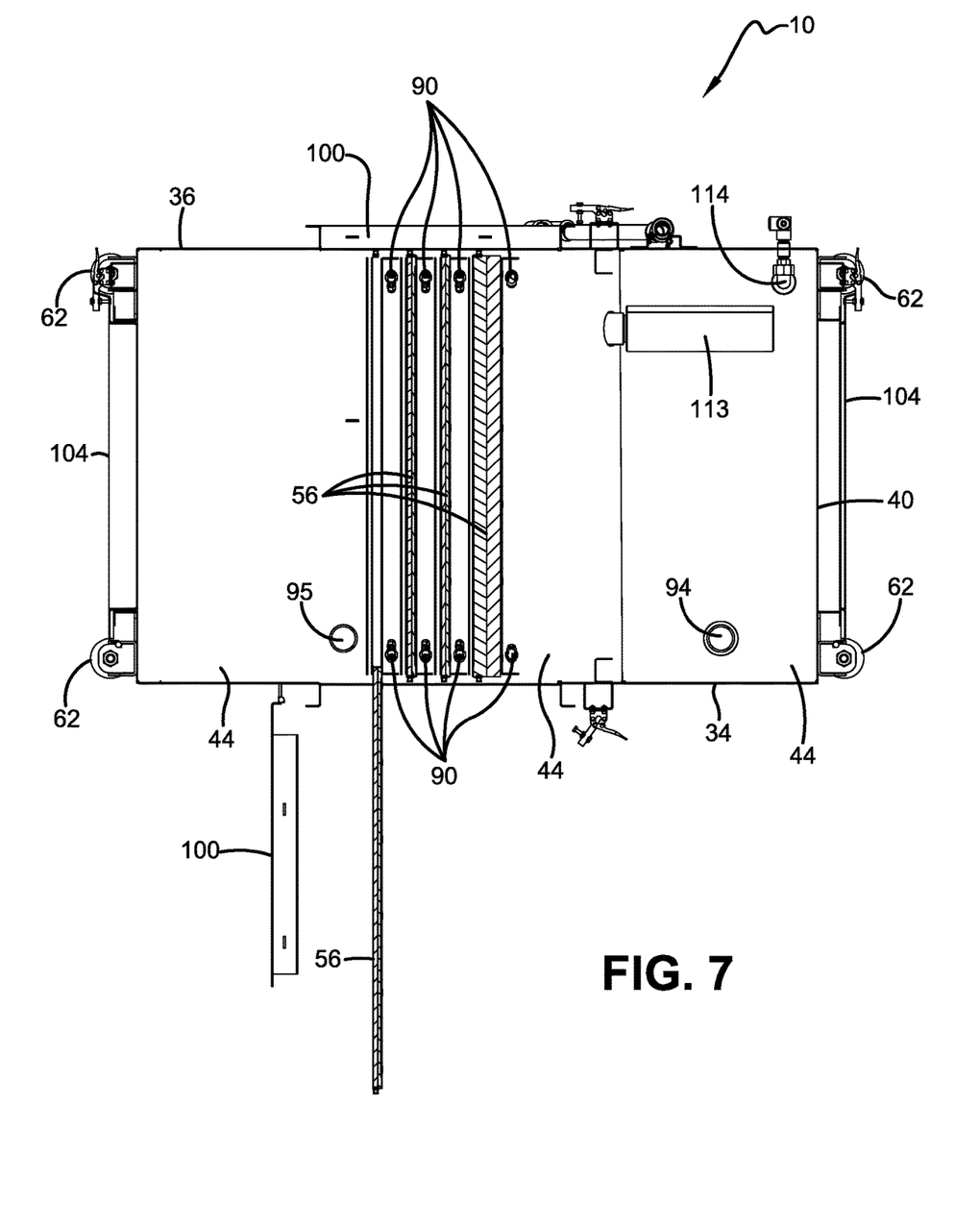
FIG. 7 is a view similar to FIG. 5 with a filter in its extended position.

As shown in FIGS. 2 and 6, demister 10 includes doors 100 that provide access to filters 56. When a filter 56 is to be cleaned, door 100 is opened and filter 56 is slid out to an extended position as shown in FIG. 7 where it can be cleaned by spraying, foaming, or a combination of both. The filter being cleaned is held at a convenient position by demister 10 and can be slid back into filter chamber 54 once cleaned. Filters 56 can be slid out of the front or the rear of demister 10. Filters 56 can be slid out and cleaned one at a time. Locating filter chamber 54 low in demister 10 allows the user to slide filters 56 out for cleaning while standing on the floor that supports demister 10. In the exemplary configuration, filter chamber 54 defines the lowest portion of the exhaust flow. The exhaust flow is generally horizontal through filter chamber 54 and each filter is arranged to be vertical and substantially perpendicular to the exhaust flow. Also, positioning filters 56 vertically allows both sides to be readily cleaned when each is slid out to the extended position. Demister 10 located filters 56 in the lowest portion of the flow path which makes them easy to access when being moved out to be cleaned. Further, filters 56 are positioned vertical with respect to the generally horizontal flow path to minimize debris from one filter falling onto another filter.

An access hatch 102 is provided for inlet chamber 50. Access hatches 104 are provided on both sides. Additional hatches can be provided for plumbing chamber 60.

After the exhaust flow is moved through filters 56, it is turned up and accelerated through outlet 32. Any further liquid or debris that falls from the flow at this stage falls against bottom wall 44 which is sloped back toward filter chamber 54.

As described above, recirculation tank 78 is integrated into demister 10. In the exemplary configuration, the bottom of recirculation tank 78 is defined by bottom wall 44 of the body of demister 10 with the sides of tank 78 being defined by portions of front 34 and rear 36 walls. In this manner, recirculation tank 78 is built into the footprint of demister 10 and integrated with the body of demister 10. The liquid from sprayers 72, 74, and 76 as well as nozzles 90 drain into recirculation tank 78 where the debris removed from the exhaust flow is collected. The liquid is recirculated to supply 112 with pump 110 which draws the liquid through a strainer 113. A float assembly 114 is used to identify the level of the liquid in recirculation tank 78. When the float 115 of assembly 114 drops to a low level that indicates strainer is close to the top of the liquid, controller switches valve 82 to supply additional liquid to demister 10 from inlet 84. Valve 82 supplies liquid until float 115 rises to a filled level. The filled level can position the upper surface of the debris floating on the top of the liquid in tank 78 below the lower edges of filters 56. Valve 82 is then switched back to supply 112. In a case where recirculation tank 78 accidently overflows into filter chamber 54, an overflow drain 95 located on the downstream side of filters 56 allows the liquid to drain from demister 10 to main drain 116. Liquid or liquid and debris can be drained to main drain 116 through drain 94 which is controlled by valve 111. This can be done to drain liquid from tank 78 that has been introduced from nozzles 90 and can be controlled by float assembly 114. Also, this can be performed periodically to allow strainer 113 to be cleaned or to remove debris from demister 10. This also can be performed before filters 56 are pulled out to be cleaned. In operation, demister 10 automatically recirculates the liquid used to remove debris from the exhaust flow and automatically introduces make-up water from inlet 84 as needed. Demister 10 also periodically rinses filters 56 to maintain filter efficiency.

Demister 10 provides a filtration system that has no moving components when in use, is easy to maintain and easy to clean. Demister 10 is 99% efficient for particles 5 micron and greater and 80% efficient for 3 micron particulate. Demister 10 can be provided in all stainless construction. Water recirculation reduces water consumption and operating costs. Demister 10 is a solution for exhaust from heavy breading applications and other applications wherein an exhaust flow is laden with debris such as particulate matter and/or grease.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the description and illustration of the invention is an example and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A demister for removing debris from debris-laden airflow that flows through the demister, the demister comprising:
   a body that defines a flow path for the debris-laden airflow;
   a plurality of filters retained by a filter retaining structure carried within the body in an operational position in the flow path; each of the filters having a height, a width, and a depth;
   the plurality of filters being located in a filter chamber; the filter chamber having a width and a height; both of the width and the height of the filter chamber being perpendicular to a portion of the flow path that passes through the filter chamber;
   the plurality of filters being aligned in series within the filter chamber across the portion of the flow path that passes through the filter chamber with each filter spanning the width and height of the filter chamber such that the flow path is required to pass through each of the plurality of filters sequentially;

the filter chamber being defined by at least one filter chamber wall;

the filter chamber wall defining a filter opening having a height that is larger than the heights of the filters and a width that is larger than the combined depths of the filters such that the each filter can be moved through the filter opening;

a plurality of nozzles adapted to be connected to a liquid supply; the nozzles directed at the filters to periodically spray liquid against the filters;

the body defining a recirculation tank located offset from and upstream of the filter chamber relative to the flow path;

a solid bottom wall of the filter chamber being sloped to direct liquid and debris removed from the filters into the recirculation tank while preventing debris-laden airflow from escaping the filter chamber through the solid bottom wall;

a door having open and closed conditions; the door covering the filter opening when the door is in the closed condition; the door engaging each of the filters when the door is in the closed condition; each filter being movable from its operational position to an extended position at least partially outside the body through the filter opening when the door is in the open condition; each filter being movable between its operational position and its extended position independent of the positions of the other filters; all of the filters being capable of being in their extended positions at the same time; and in the extended position, each filter being at least partially retained by the filter retaining structure of the body while also projecting laterally from the body to allow the filter to be cleaned while being located substantially outside of the filter chamber.

2. The demister of claim 1, wherein the demister body defines a drain on the downstream side of the plurality of filters with respect to the flow path.

3. The demister of claim 1, wherein each of the filters is arranged vertically and the flow path is substantially horizontal through the filters.

4. The demister of claim 1, wherein the flow path defined by the body includes an inlet and an outlet; and wherein the portion of the flow path that passes through the filter chamber is lower than the inlet and outlet.

5. The demister of claim 4, wherein the portion of the flow path that passes through the filter chamber is the lowest portion of the flow path defined by the demister body.

6. The demister of claim 4, wherein the flow path defined by the body includes a first vertical portion between the inlet and the portion of the flow path that passes through the filter chamber.

7. The demister of claim 6, wherein the flow path defined by the body includes a second vertical portion between the outlet and the portion of the flow path that passes through the filter chamber.

8. The demister of claim 7, wherein the body defines an inlet chamber; at least one liquid sprayer adapted to spray liquid into the inlet chamber; the inlet chamber draining into the recirculation tank.

9. A demister for removing debris from debris-laden airflow that flows through the demister, the demister comprising:

a body defining a flow path having a flow path inlet for the debris-laden airflow and an outlet;

the body defining a first vertical flow path portion, a second horizontal flow path portion; and a third vertical flow path portion; the second horizontal flow path portion being located between the lowermost ends of the first and third vertical flow path portions;

the first vertical flow path portion extending between the flow path inlet and an upstream end of the second horizontal flow path portion;

the third vertical flow path portion extending between a downstream end of the second horizontal flow path portion and the outlet;

the body defining a recirculation tank located below the first vertical flow path portion and upstream of the second horizontal flow path portion;

a plurality of filters carried by the body in an operational position in a filter chamber that defines the second horizontal flow path portion; the plurality of filters being aligned in series across the second horizontal flow path portion such that the second horizontal flow path portion is required to pass through each of the plurality of filters sequentially;

the filter chamber being defined by at least a front filter chamber wall a rear filter chamber wall, and a solid bottom filter chamber wall;

the solid bottom filter chamber wall being sloped to direct liquid and debris removed from the filters into the recirculation tank while preventing debris-laden airflow from escaping the filter chamber through the solid bottom wall;

each of the front and rear filter chamber walls defining a filter opening sized to allow each of the plurality of filters to move through the filter opening;

a plurality of nozzles adapted to be connected to a liquid supply; the nozzles directed at the filters to periodically spray liquid against the filters;

a front door and a rear door;

each of the front and rear doors having open and closed conditions; the front door covering the filter opening defined by the front filter chamber wall when the front door is in the closed condition; the rear door covering the filter opening defined by the rear filter chamber wall when the rear door is in the closed condition;

each of the front and rear doors engaging each of the filters when the doors are in the closed condition;

when both the front and rear doors are in the open condition, each of the filters is movable from its operational position to an extended position at least partially outside the body through either of the filter openings;

each filter being movable between its operational position and its extended position independent of the other filters; all of the filters being capable of being in their extended positions at the same time; and in the extended position, each filter being carried by the body while also projecting laterally from the body to allow the filter to be cleaned while being located substantially outside of the filter chamber.

10. The demister of claim 9, wherein the nozzles are arranged to spray upstream and downstream sides of each filter.

11. The demister of claim 9, wherein each of the filters is carried in a vertical orientation.

12. The demister of claim 9, wherein the second horizontal flow path portion is located at a lowest portion of the flow path such that a user can clean a filter in its extended position while standing on a floor that supports the demister.

* * * * *